(12) United States Patent
Ueda

(10) Patent No.: US 6,188,438 B1
(45) Date of Patent: *Feb. 13, 2001

(54) METHOD OF AND APPARATUS FOR IDENTIFYING A SIGNAL TRANSMITTING SOURCE

(75) Inventor: Mamoru Ueda, Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/618,998

(22) Filed: Mar. 21, 1996

(30) Foreign Application Priority Data

Mar. 24, 1995 (JP) .................................................. 7-066297

(51) Int. Cl.$^7$ .............................. H04N 7/00; H04N 11/00
(52) U.S. Cl. .......................... 348/460; 348/555; 348/705; 348/706
(58) Field of Search ....................... 348/460, 558, 348/555, 461, 465, 467, 473, 474, 705, 706; H04N 7/00, 11/00

(56) References Cited

U.S. PATENT DOCUMENTS

| | | | |
|---|---|---|---|
| 4,613,904 | * 9/1986 | Lurie | 348/1 |
| 4,723,302 | * 2/1988 | Fulmer et al. | 348/1 |
| 4,945,412 | * 7/1990 | Kramer | 348/460 |
| 5,187,575 | * 2/1993 | Lim | 348/555 |
| 5,339,111 | * 8/1994 | Park | 348/555 |
| 5,444,491 | * 8/1995 | Lim | 348/555 |
| 5,457,499 | * 10/1995 | Lim | 348/555 |
| 5,485,462 | * 1/1996 | Helm et al. | 370/95.1 |
| 5,526,427 | * 6/1996 | Thomas et al. | 348/1 |
| 5,532,732 | * 7/1996 | Yuen et al. | 348/1 |
| 5,630,203 | * 5/1997 | Weinblatt | 348/1 |
| 5,646,675 | * 7/1997 | Copriviza et al. | 348/1 |

OTHER PUBLICATIONS

Proposed SMPTE Standard for Television—Serial Data Transport Interface, Aug. 24, 1998.

* cited by examiner

Primary Examiner—Nathan Flynn
Assistant Examiner—Vivek Srivastava
(74) Attorney, Agent, or Firm—Frommer Lawrence & Haug, LLP; William S. Frommer; Gordon Kessler

(57) ABSTRACT

A method of and apparatus for identifying a signal transmitting source detects a switching of a signal on the reception side thereby to prevent a transmission error from occurring when a signal is switched. The apparatus for identifying a signal transmitting source comprises a transmitting source identifying code extracting circuit for extracting a transmitting source identifying code provided in a SDDI format header of a received signal, a preceding transmitting source identifying code holding circuit for detecting a change of the transmitting source identifying code, and a transmitting source identifying code comparing circuit for detecting a switching of a transmitted signal based on the transmitting source identifying code thus changed, thereby detecting a switching of the transmitting source.

6 Claims, 11 Drawing Sheets

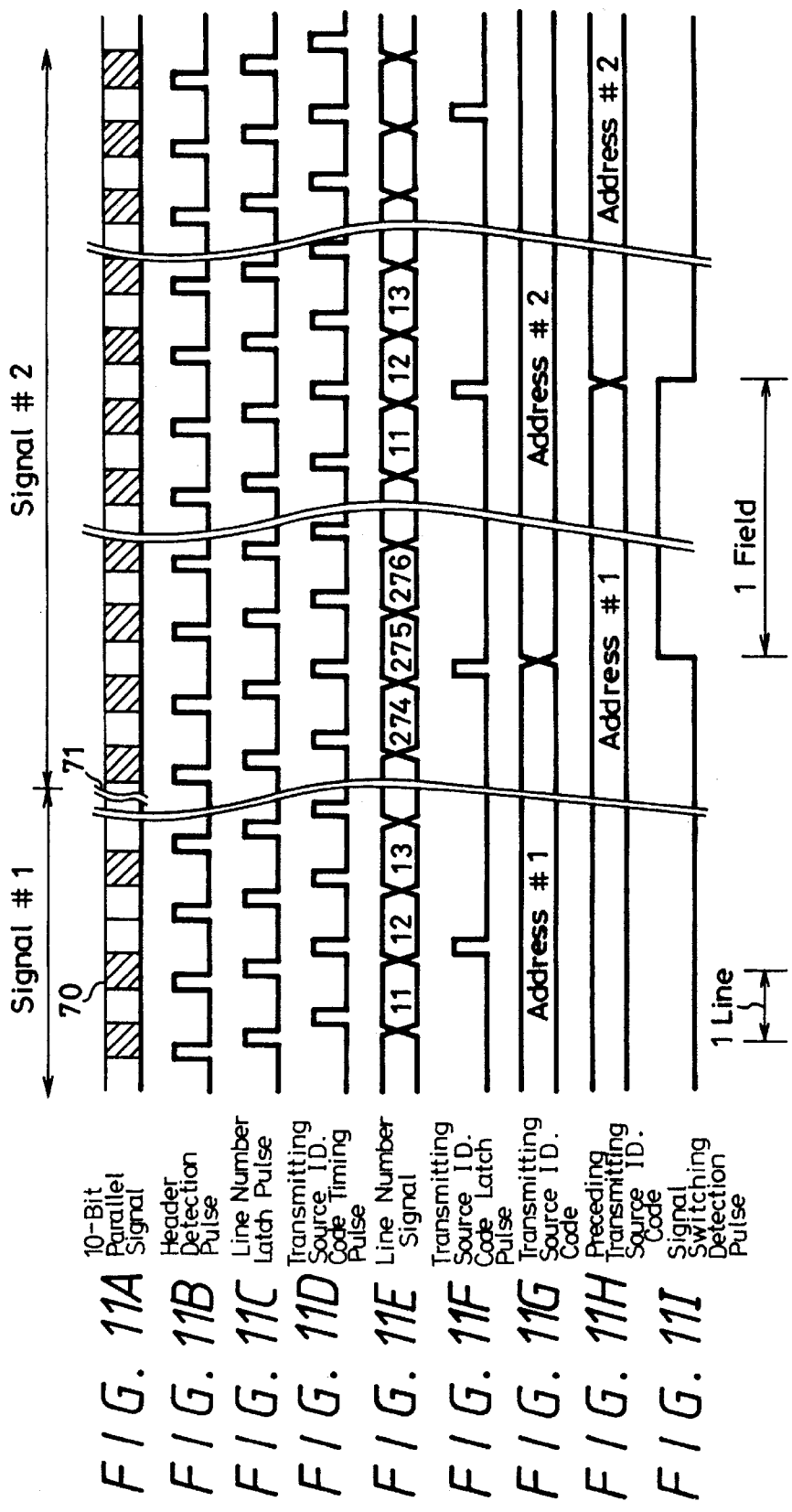

METHOD OF AND APPARATUS FOR IDENTIFYING A SIGNAL TRANSMITTING SOURCE

BACKGROUND OF THE INVENTION

The SMPTE 259M has hitherto been known as the standard for serial digital interface (hereinafter simply referred to as a "SDI") of video signal used in professional and broadcasting station video equipments. This SMPTE 259M standard describes a serial digital interface for 525/60 and 625/50 digital television equipment operating with either 4:2:2 component signals or $4f_{sc}$ composite digital signals.

FIG. 1 of the accompanying drawings shows the SDI format.

As shown in FIG. 1, the SDI format comprises an EAV (end of active video) 131 provided at the starting portion, an ancillary signal area 132 provided next to the EAV 131, and a SAV (start of active video) 133 provided next to the ancillary signal area 132. The EAV 131 and SAV 133 comprise words (3FF, 000, 000, XYZ)$_h$ each word of which is a hexadecimal signal. The EAV 131, the ancillary signal area 132, and the SAV 133 are composed of 276 words for the 525/60 television receiver, and composed of 288 words for the 625/50 the television receiver.

The SDI format further includes an effective image signal area 134 provided next to the SAV 133, and the effective image signal area 134 is used to transmit an image signal. The effective image signal area 134 is followed by a timing reference signal EAV 135. The image signal comprises a luminance signal Y and blue and red color difference signals Cb, Cr each of which is a 10-bit digitized signal, and the luminance signal Y and the blue and red color difference signals are arranged in the sequential order of Cb, Y, Cr and Y. The effective image signal area 134 is composed of 1440 words for both the 525/60 television receiver and the 625/50 television receiver. Therefore, an area which results from adding the effective image signal area 134 to the EAV 131, the ancillary signal area 132 and the SAV 133 is composed of 1716 words for the 525/60 television receiver, and composed of 1728 words for the 625/50 television receiver.

The effective image signal area 134 is followed by the timing reference signal EAV 135. The timing reference signal EAV 135 is composed of words (3FF, 000, 000, XYZ)$_h$ each word of which is a hexadecimal signal. The SAV 133, and the EAV 131, 135 are inserted into the horizontal blanking period.

A parallel signal according to the SDI format is converted in the form of parallel to serial signal, and in this case, the LSB (least significant bit) of any data word shall be transmitted first. Then, the serial signal is converted into a scrambled NRZI (nonreturn-to-zero inverted) signal, channel-coded, and thereby transmitted as serial digital video signal of 270 Mbit/sec.

In the SDI format signal transmission system, the serial digital video signal is transmitted with a word synchronization of word unit. However, in this SDI format signal transmission system, it is frequently demanded that a plurality of signals are switched by a signal switching device. This signal switching device switches and outputs the inputted signal in the form of the serial signal. Before or after the signal is switched by the signal switching device, a word synchronization of signal becomes discontinuous, and a synchronization of switched signal is not achieved, thereby causing a transmission error. The transmission error continuously occurs until a word synchronization of signal is established by the next EAV.

For this reason, according to the SDI format, a signal is switched during a vertical blanking period, whereby a signal error that occurred due to a discontinuous word synchronization of signal generated when the signal is switched can be prevented from becoming conspicuous on a picture screen of a television receiver on the reception side.

As described above, in the SDI format signal transmission system, before or after a plurality of signals are switched by the signal switching device, a word synchronization of signal becomes discontinuous, and a synchronization of switched signal cannot be established, resulting in a transmission error. In order to avoid the occurrence of transmission error, a signal has to be switched during the vertical blanking period.

SUMMARY OF THE INVENTION

In view of the aforesaid aspect, it is an object of the present invention to provide method of and apparatus for identifying a signal transmitting source in which the reception side detects a switching of a signal thereby to prevent a transmission error from occurring when signals are switched.

According to an aspect of the present invention, there is provided a receiving apparatus for receiving a transmitted signal with a transmitting source identifying code added thereto at a transmission end of a transmission line as a received signal. This receiving apparatus comprises transmitting source identifying code extracting means for extracting the transmitting source identifying code from the received signal, transmitting source identifying code change detecting means for detecting a change of the transmitting source identifying code extracted from the received signal by the transmitting source identifying code extracting means, and transmitted signal switching detecting means for detecting a switching of the transmitted signal based on the transmitting source identifying code whose change was detected by the transmitting source identifying code detecting means.

According to another aspect of the present invention, there is provided a method of switching a transmitted signal which is comprised of the steps of adding a transmitting source identifying code to a transmitted signal at a transmitting end of a transmission line, extracting the transmitting source identifying code at a receiving end of the transmission line, detecting a change of the transmitting source identifying code extracted at the receiving end, and detecting a switching of the transmitted signal based on the transmitting source identifying code this changed.

BRIEF DESCRIPTION OF THE DRAWINGS

FIGS. 11A through 11I are timing charts showing a manner in which a switching of a signal is detected at the field unit according to another embodiment of the present invention.

DETAILED DESCRIPTION OF THE PREFERRED EMBODIMENTS

The present invention will now be described with reference to the drawings.

Figure 1:
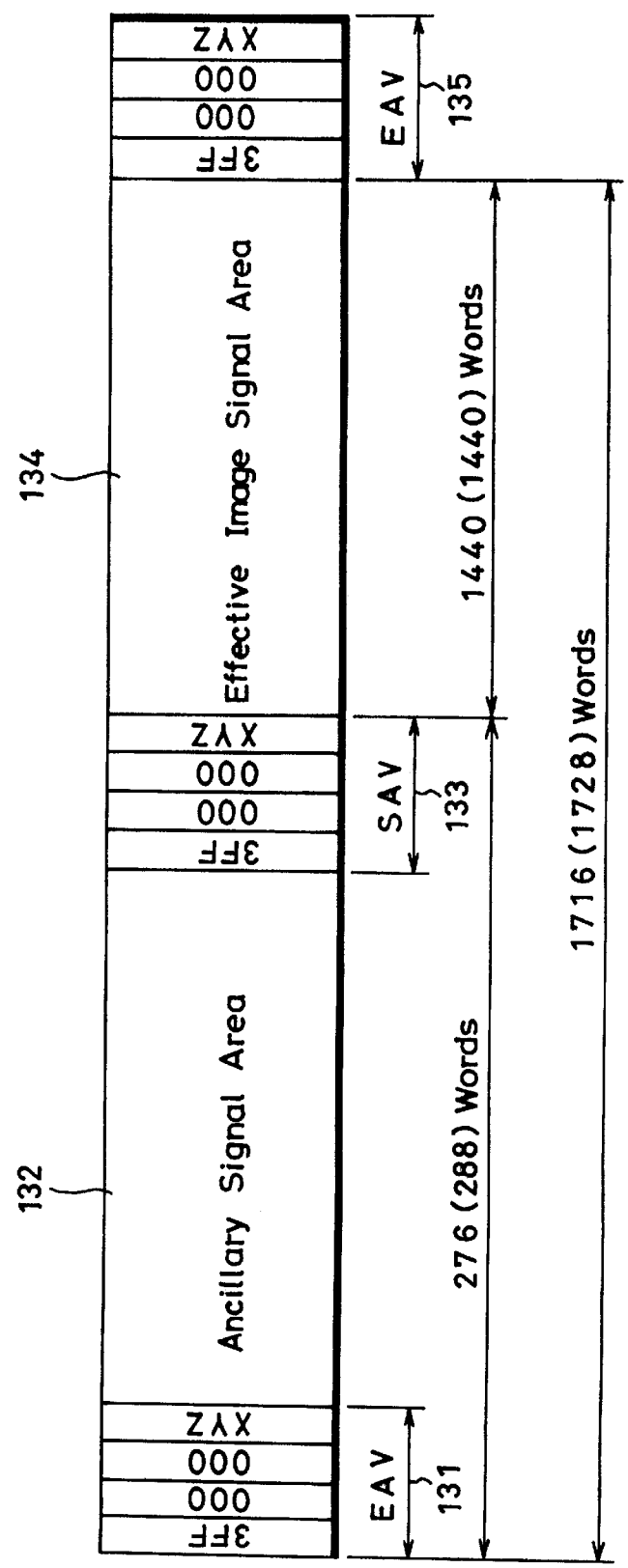
FIG. 1 is a diagram showing a SDI format.
Figure 2:
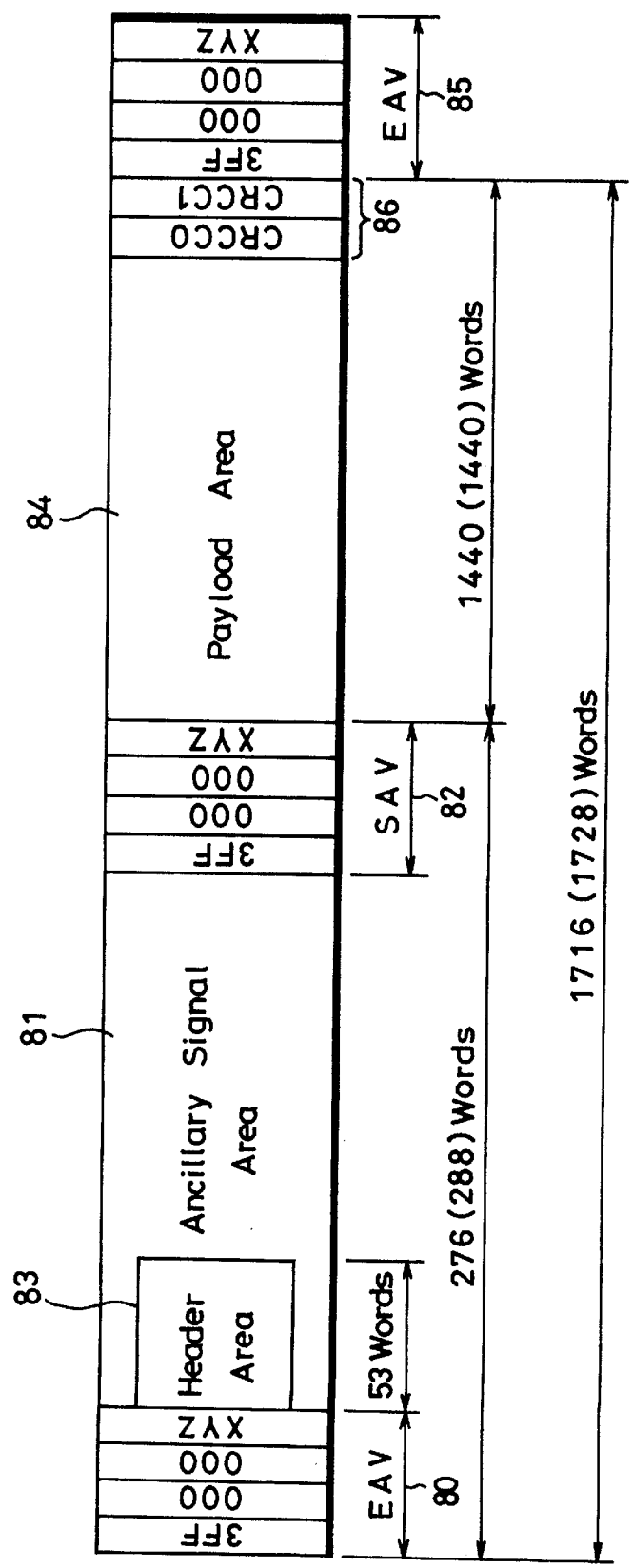
FIG. 2 is a diagram showing a SDDI format.

FIG. 2 shows a SDDI (serial digital data interface) format, and this SDDI format has been independently developed by the same assignee of this application. In comparison with the SDI (serial digital interface) format shown in FIG. 1, the SDDI format can transmit not only digital data in the effective image signal area but also compressed and encoded image information or audio information or control information together with original image information.

As shown in FIG. 2, the SDDI format comprises an EVA 80 (end of active video), an ancillary signal area 81 provided next to the EAV 80, and a SAV (start of active video) 82 provided next to the ancillary signal area 81. The EAV 80 and the SAV 82 are composed of words (3FF, 000, 000, XYZ)$_h$ each word of which is a hexadecimal signal. The EAV 80, the ancillary signal area 81 and the SAV 82 are composed of 276 for the 525/60 television receiver, and 288 words for the 625/50 television receiver.

The SAV 82 is followed by a payload area 84, and the payload area 84 contains a compressed image signal therein. This compressed image signal is digital data which results from high-efficiency-coding a video signal. The payload area 84 is followed by CRCC (cyclic redundancy check code) 0, CRCC1 86.

The CRCC0, CRCC1 will be described below. An information frame, which is transmitted through a communication network, is added with a remainder term which results from a certain division, and then transmitted. A transmission error is checked by comparing a remainder term, which results from effecting a similar calculation on a received signal on the receiving end, with the remainder term transmitted thereto. Generator polynomial is used in such division.

The payload area 84 and the CRCC0, CRCC1 86 are composed of 1440 words for both the 525/60 television receiver and the 625/50 television receiver.

Accordingly, an area which results from adding the payload area 84 and the CRCC0, CRCC1 86 to the EAV 80, the ancillary signal area 81 and the SAV 82 is composed of 1716 words for the 525/60 television receiver, and composed of 1728 words for the 625/50 television receiver.

In particular, according to this embodiment, the ancillary signal area 81 includes a header area 83 provided at its beginning. The header area 83 includes a transmitting source identifying address, and is composed of 53 words.

The payload area 84 is followed by a timing reference signal area EVA, and the EVA 85 is composed of words (3FF, 000, 000, XYZ)$_h$ each word of which is a hexadecimal signal. The SAV 82, the EAV 80 and the EAV 85 are inserted into the horizontal blanking period.

Figure 3:
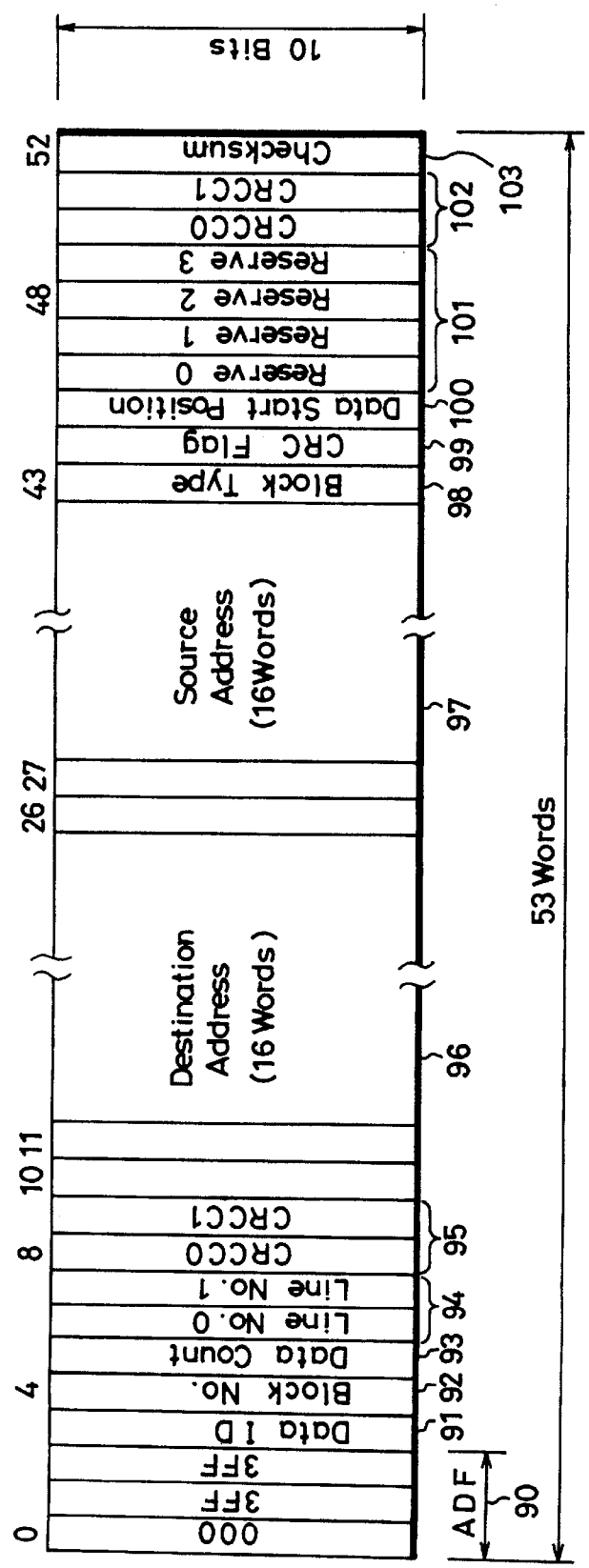
FIG. 3 is a diagram showing a header area in the SDDI format shown in FIG. 2 more fully.

FIG. 3 is a diagram showing a header area 83 in the SDDI format more in detail. As shown in FIG. 3, an ADF (ancillary data flag) 90 provided at the beginning of the header area 83 is composed of 3 words (000, 3FF, 3FF)$_h$ each word of which is a hexadecimal signal. The ADF 90 is a code indicative of the beginning of the ancillary signal packet. A data ID 91 indicates contents of ancillary signal, such as digital audio data, time code or error-detection code.

A block number 92 is used to detect a continuity of data packet, and can detect a continuity of data packets ranging from 0 to 255 by effecting 8-bit count-up. A data count 93 is used to count the number of words of user data in the ancillary signal.

Line number 0 and line number 1, generally denoted by reference numeral 94, are used to indicate the number of scanning lines from 1 to 525.

CRCC0 and CRCC1, generally denoted by reference numeral 95, are error-detection codes used to detect errors in the areas ranging from ADF 90 to the line number 0 and line number 1, 94.

A destination address 96 is used to indicate address of data destination, and a source address 97 is a transmitting source identifying code used to indicate a data transmitting source. The source address 97 adds unique individual codes to video equipments when these video equipments are delivered. In this embodiment, the source address 97 is composed of 16-word data area which comprises 128-bit data.

A block type 98 is used to indicate a block type of the payload area 84. A CRC flag 99 is used to indicate whether or not the CRCC0 and CRCC1, 86 provided at the rear end of the payload area 84 are valid. A data start position 100 is used to indicate a data start position of the payload area 84. Reserve 0, reserve 1, reserve 2 and reserve 3, generally denoted by reference numeral 101, are preliminary ones.

CRCC0 and CRCC1, generally denoted by reference numeral 102, are error-detecting codes used to detect errors in the areas ranging from the destination address 96, the source address 97, the block type 98, the CRC flag 99, the data start position 100, the reserve 0, the reserve 1, the reserve 2 and the reserve 1, 101. A checksum 103 is used to detect transfer errors from a sum total of respective digits of data from data ID 91 to the CRCC0 and CRCC1, 102.

Figure 4:
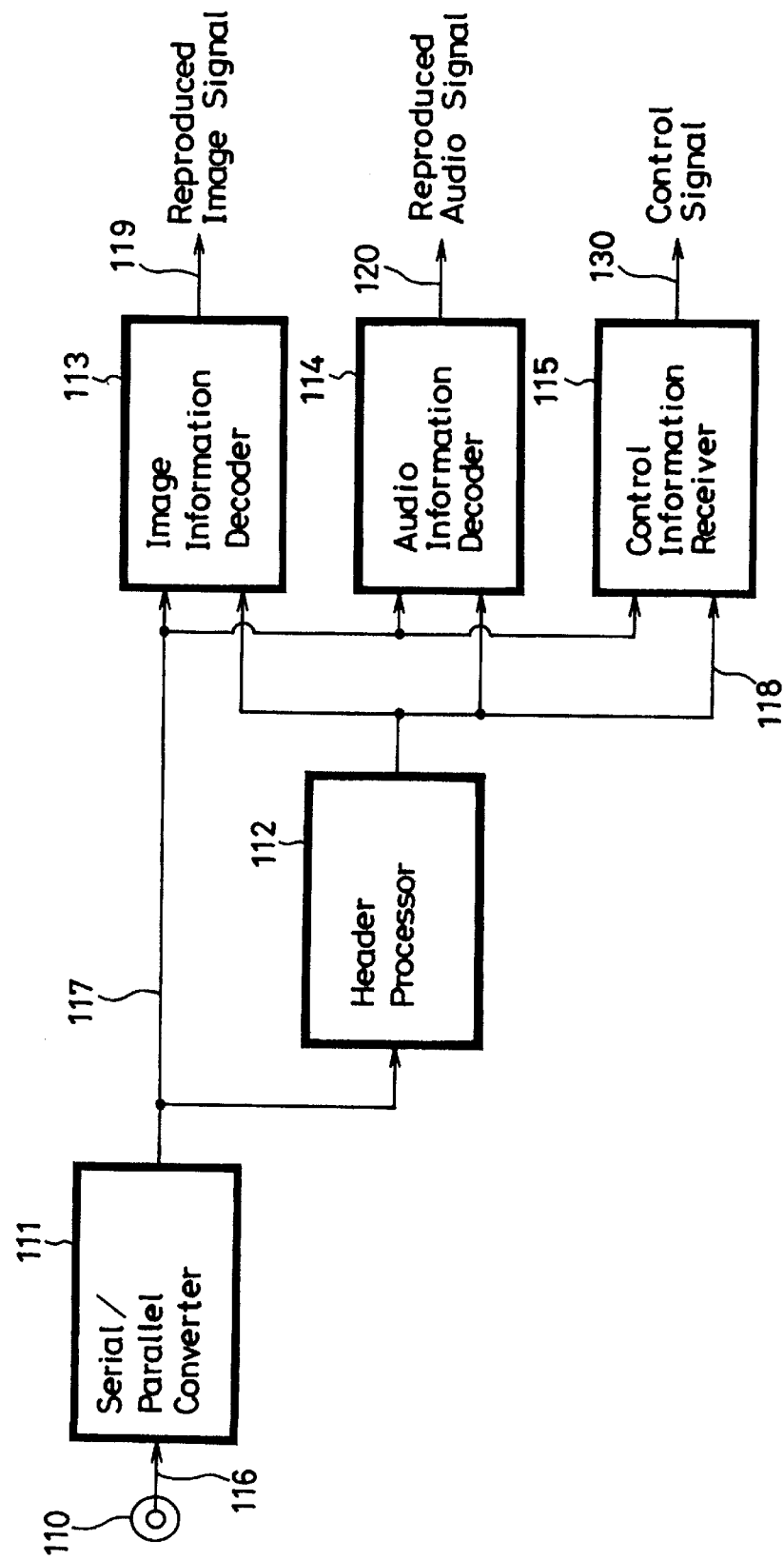
FIG. 4 is a block diagram showing a video signal output portion in a SDDI format video equipment.

FIG. 4 shows, in block form, a video signal output portion of a SDDI format video equipment.

As shown in FIG. 4, a serial signal transmitted through a transmission cable from a transmission side (not shown) is supplied to a BNC coax connector 110. The received serial signal supplied to the BNC coax connector 110 is supplied to a serial-to-parallel (serial/parallel) converter 111.

The serial-to-parallel converter 111 waveform-equalizes the received serial signal transmitted thereto at 270 [Mbp/s], reproduces a serial clock, and decodes a channel code by scrambled NRZI. Further, the serial-to-parallel converter 111 reproduces a word synchronizing signal by detecting a timing reference signal (EAV/SAV), and converts the received serial signal into a 10-bit parallel signal 117.

One 10-bit parallel signal 117 is supplied to an image information decoder 113, an audio information decoder 114, and a control information receiver 115. The image information decoder 113 extracts a compressed and encoded image signal from the 10-bit parallel signal, and outputs a reproduced image signal 119 by decoding this image signal. The audio information decoder 114 extracts a compressed and encoded audio signal from the 10-bit parallel signal 117, and outputs a reproduced audio signal 120 by decoding this audio signal. The control information receiver 115 extracts control information from the 10-bit parallel signal 117, and outputs a control signal 130 based on the extracted control information.

The other 10-bit parallel signal 117 is supplied to a header processor 112, and the header processor 112 processes signals in the header area 83 of the SDDI format. When the header processor 112 processes the signals in the header area 83, the header processor 112 outputs a variety of signals, such as the transmitting source identifying code and a signal switching detecting signal. Signals of the header area 83 processed by the header processor 112 are supplied to the image information decoder 113, the audio information decoder 114 and the control information receiver 115.

The signals of the header area 83 processed by the header processor 112 are the transmission source identifying code and the signal switching detecting signal 118. The transmitting source identifying code is the source address 97 shown in FIG. 3.

Arrangement and operation of the header processor 112 shown in FIG. 4 will be described in detail below with reference to FIGS. 5 to FIGS. 11A through 11I.

Figure 5:
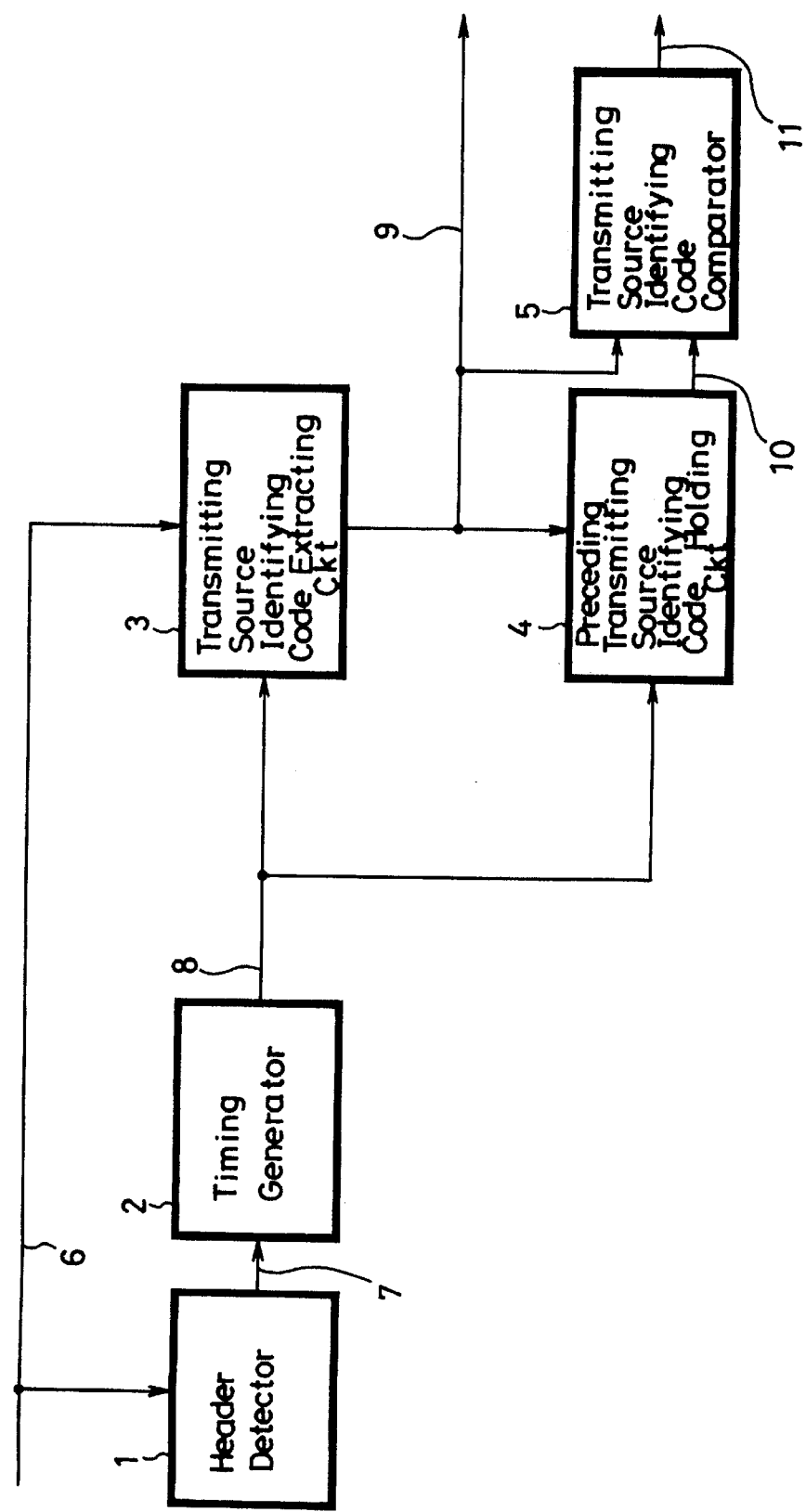
FIG. 5 is a block diagram showing a header processor shown in FIG. 4 more in detail.

FIG. 5 is a block diagram showing the header processor 112 for detecting the switching of signal at the line unit. In this embodiment, the transmitting source identifying signal which indicates the transmitting source of the leader area 83 added to the SDDI format transmission signal is detected by the reception side at the line unit, and the header processor 112 detects the switching of the transmitting source based on the change of the transmitting source identifying code.

As shown in FIG. 5, a 10-bit parallel signal 6 is a signal which is supplied from the serial/parallel converter 111 shown in FIG. 4 to the header processor 112. One 10-bit parallel signal 6 is supplied to a header detector 1. The header detector 1 detects (000, 3FF, 3FF, 140, 101)$_h$ of a hexadecimal signal of a fixed pattern indicative of the beginning of the header area 83 of the SDDI format, and supplies a header detected pulse 7 to a timing generator 2.

Figure 6:
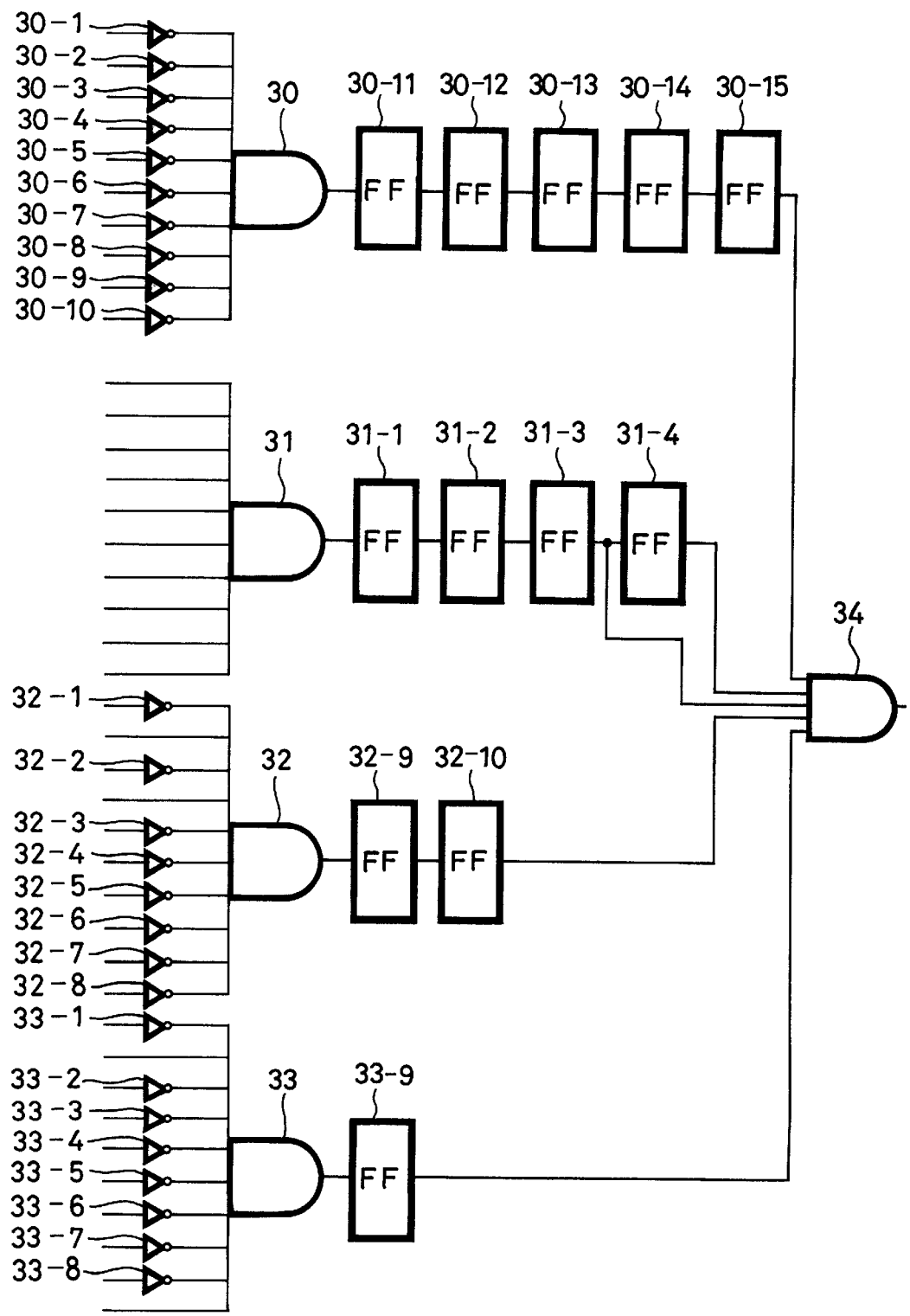
FIG. 6 is a circuit diagram of a header detector shown in FIG. 5.

FIG. 6 is a circuit diagram of the header detector 1 according to the present invention. As shown in FIG. 6, when (0000000000)$_2$ of a binary signal, i.e., (000)$_h$ of a hexadecimal signal is supplied through inverters 30-1, 30-2, 30-3, 30-4, 305, 30-6, 30-7, 30-8, 30-9, 30-10 to a 10-bit input AND circuit 30 of the first stage, a detected signal is supplied through five flip-flops (FFs) 30-11, 30-12, 30-13, 30-14, 30-15 to a 5-input AND circuit 34.

When (1111111111)$_2$ of a binary signal i.e., (3FF)$_h$ of a hexadecimal signal is supplied to a 10-bit input AND circuit 31 of the second stage, a detected signal is supplied through three flip-flops 31-1, 31-2, 31-3 and four flip-flops 31-1, 312, 31-3, 31-4 to the 5-input AND circuit 34.

When (0101000000)$_2$ of a binary signal i.e., (140)$_h$ of a hexadecimal signal is supplied through inverters 32-1, 32-2, 32-3, 32-4, 32-5, 32-6, 32-7, 32-8 to a 10-bit input AND circuit 32 of the third stage, a detected signal is supplied through two flip-flops 32-9, 32-10 to the 5-input AND circuit 34.

When (0100000001)$_2$ of a binary signal, i.e., (101)$_h$ of a hexadecimal signal is supplied through inverters 33-1, 33-2, 33-3, 33-4, 33-5, 33-6, 33-7, 33-8 to a 10-bit input AND circuit 33 of the four stage, a detected signal is supplied through a flip-flop 33-9 to the 5-input AND circuit 34.

When (000, 3FF, 3FF, 140, 101)$_h$ of the hexadecimal signal which is a fixed pattern indicative of the beginning of the header of the SDDI format is supplied to the 5-input AND circuit 34, the 5-input AND circuit 34 outputs a header detected signal 7.

Referring back to FIG. 5, the header detected pulse 7 from the header detector 1 is supplied to the timing generator 2.

The timing generator 2 is composed of a counter, and the timing generator 2 generates a timing pulse for latching therein the transmitting source identifying code latch pulse and a variety of information provided within the header of the SDDI format when the counter thereof counts the header detected pulse 7.

The other 10-bit parallel signal 6 is supplied to the transmitting source identifying code extracting circuit 3, and the transmitting source code latch pulse 8 is supplied to the transmitting source identifying code extracting circuit 3. The transmitting source code extracting circuit 3 is composed of a latch, for example. The transmitting source code extracting circuit 3 latches therein the data of the 10-bit parallel signal 6 supplied thereto in response to the transmitting source identifying code latch pulse 8 supplied thereto as a clock. Thus, the transmitting source identifying code extracting circuit 3 latches the transmitting source identifying code 9 therein.

The transmitting source identifying code 9 thus latched is supplied to the video equipment body (not shown), and thereby used in discriminating or displaying a signal transmitting source equipment. The transmitting source identifying code 9 is supplied to a preceding transmitting source identifying code holding circuit 4, and a transmitting source identifying code comparator 5. The preceding transmitting source identifying code holding circuit 4 is composed of a latch, for example. The preceding transmitting source identifying code holding circuit 4 latches therein a one-line-preceding transmitting source identifying code 10, that has been latched in the transmitting source identifying code extracting circuit 3, in response to the transmitting source identifying code latch pulse 8 supplied thereto as a clock. The preceding transmitting source identifying code holding circuit 4 comprises a transmitting source identifying code change detecting means.

The transmitting source identifying code comparator 5 compares the one-line-preceding transmitting source identifying code 10 latched by the transmitting source identifying code extracting circuit 3 and the transmitting source identifying code 3 newly latched by the transmitting source identifying code extracting circuit 3.

Figure 7:
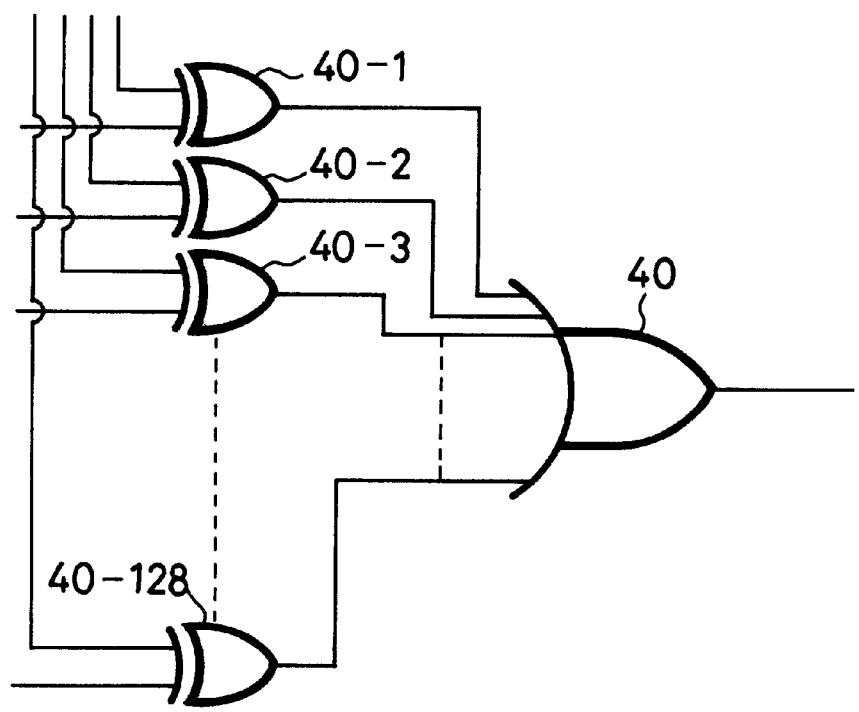
FIG. 7 is a circuit diagram showing more fully a transmitting source identifying code comparing circuit shown in FIG. 5.
Figure 8:
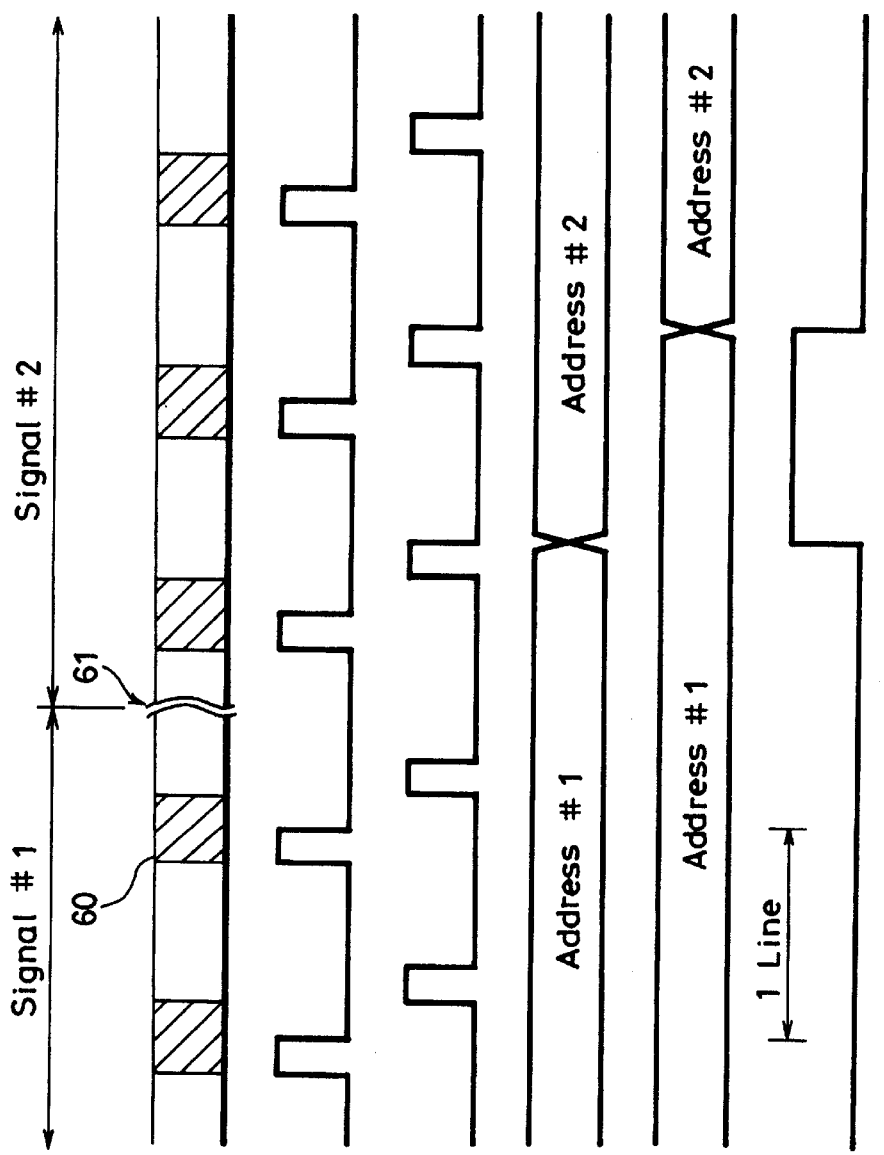
FIGS. 8A through 8F are timing charts showing a manner in which a switching of a signal is detected at the line unit according to the present invention.

FIG. 7 is a circuit diagram showing more in detail the transmitting source identifying code comparator 5 shown in FIG. 5.

As shown in FIG. 7, 16-word (128-bit) transmitting source identifying code 9 and the preceding transmitting source identifying code 10 are supplied to 128 exclusive-OR circuits 40-1, 40-2, 40-3, . . . 40-128, respectively. Outputs from the 128 exclusive-OR circuits 40-1, 40-2, 40-3, . . . 40-128 are supplied to a 128-input OR circuit 40.

Therefore, when the transmitting source identifying code 9 and the preceding transmitting source identifying code 10 are not agreed with each other, the transmitting source identifying code comparator 5 determines that the signal is switched, and outputs a signal switching detection signal 11.

FIGS. 8A through 8F are timing charts showing a manner in which a switching of signal is detected at the line unit according to the present invention. FIG. 8A shows the 10-bit parallel signal 6, FIG. 8B shows the header detection pulse 7, FIG. 8C shows the transmitting source identifying code latch pulse 8, FIG. 8D shows the transmitting source identifying code 9, FIG. 8E shows the preceding transmitting source identifying code 10, and FIG. 8F shows the signal switching detection signal 11, respectively. A manner in which the switching of signal is detected will be described below.

As shown in FIG. 8A, the 10-bit parallel signal 6 is switched from a signal #1 to a signal #2 at a signal switching portion 61. A portion shown hatched in the 10-bit parallel signal 6 represents a header 60 of SDDI format, and the header 60 is transmitted at every line. The 10-bit parallel signal 6 is supplied to the header detector 1 and the transmitting source identifying code extracting circuit 3 as shown in FIG. 5.

As shown in FIG. 8B, the header detection pulse 7 is obtained by detecting the header 60 of the SDDI format. The header detection pulse 7 is a pulse with a predetermined pulse width and whose leading edge is coincident with the leading edge of the header 60 of the SDDI format. The header detection pulse 7 is outputted from the header detector 1 as shown in FIG. 5.

As shown in FIG. 8C, the transmitting source identifying code latch pulse 8 is obtained based on the header detection pulse 7 after a predetermined period elapsed from the header detection pulse 7. The transmitting source identifying code latch pulse 8 is outputted from the timing generator 2 when the timing generator 2 counts the header detection pulse 7 as shown in FIG. 5.

As shown in FIG. 8D, the transmitting source identifying code 9 of address #2 is obtained at the trailing edge of the transmitting source identifying code latch pulse 8 that was first detected after the signal has been switched at the signal switching portion 61. The addresses #1 and #2 are addresses of the signals #1 and #2 corresponding to the transmitting sources.

As shown in FIG. 8E, there is obtained the one-line-preceding transmitting source identifying code 10 of the transmitting source identifying code. As shown in FIG. 5, the one-line-preceding transmitting source identifying code 10 is generated from the preceding transmitting source identifying code holding circuit 4 when the preceding transmitting source identifying code holding circuit 4 latches therein the transmitting source identifying code in response to the transmitting source code latch pulse 8 supplied thereto as a clock.

As shown in FIG. 8F, the signal switching detection signal 11 is obtained at a timing corresponding to the trailing edge of the transmitting source identifying code latch pulse 8 that was first detected after the signal has been switched at the signal switching portion 61. The signal switching detection signal 11 has a predetermined width of a period corresponding to a difference between the period of the transmitting source identifying code 9 and the period of the preceding transmitting source identifying code 10. As shown in FIG. 5, the transmitting source identifying code comparator 5 generates the signal switching detection signal 11 by comparing the transmitting source identifying code 9 and the preceding transmitting source identifying code 10.

According to the above embodiment, the transmitting source identifying code is extracted from the SDDI format header of the received signal, the transmitting source code that was added to the transmission signal upon transmission is extracted, the change of the transmitting source identifying code is detected, the change of the transmitting source identifying code indicative of the transmitting source added to the transmission signal upon transmission is detected, and the switching of the changed transmitting source identifying code is detected on the basis of the changed transmitting source identifying code, whereby the switching of the transmitting source can be detected at the line unit.

Figure 9:
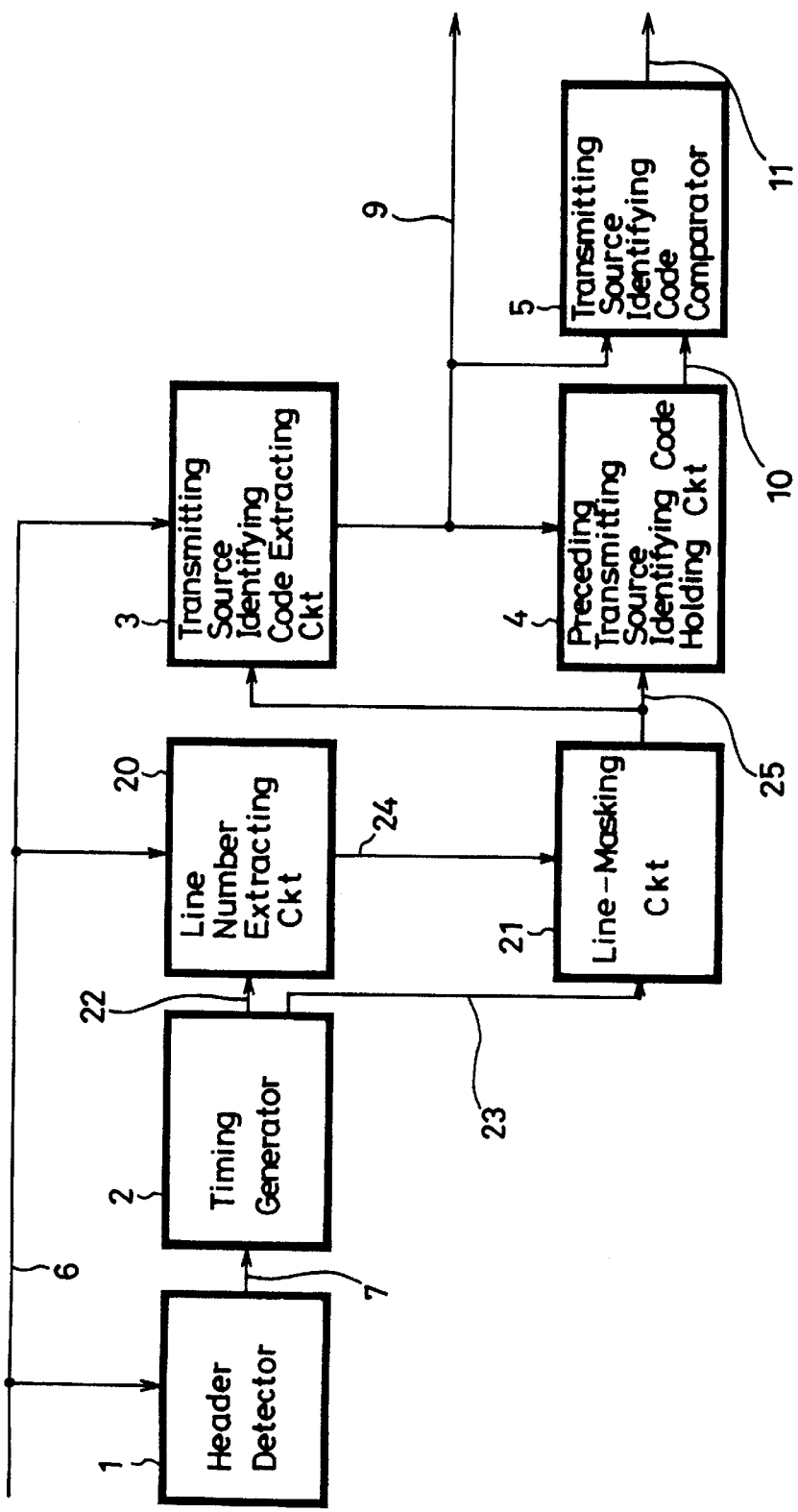
FIG. 9 is a block diagram showing a header processor for detecting a manner in which a switching of a signal is detected at the field unit according to another embodiment of the present invention.

FIG. 9 is a block diagram showing the header processor 112 (shown in FIG. 4) which detects the switching of signal at the field unit according to another embodiment of the present invention. In this embodiment, the receiving side detects the transmitting source identifying code indicative of the transmitting source in the header area added to the SDDI format transmission signal at the field unit, and detects that the switching of the transmitting source when the change of the transmitting source identifying code is detected.

According to the SDDI format, line No. 6 or line No. 9 is previously determined as a signal switching position for the 625/50 television receiver, and line No. 10 or line No. 273 is previously determined as a signal switching position for the 525/60 television receiver. Therefore, the transmitting source identifying codes are compared with each other at the position immediately after the above signal switching position.

In FIG. 9, elements and parts identical to those of FIG. 5 are marked with the same reference numerals, and therefore need not be described in detail. Thus, only different elements and parts will be described in detail below.

As shown in FIG. 9, the 10-bit parallel signal 6 is supplied from the serial/parallel converter 11 shown in FIG. 4 to the header processor 12. The 10-bit parallel signal 6 is supplied to the header detector 1. The header detector 1 detects (000, 3FF, 3FF, 140, 101)$_h$ of hexadecimal signal which is a fixed pattern indicating the beginning of the header of the SDDI format, and supplies the header detection pulse 7 to the timing generator 2.

The header detection pulse 7 generated from the header detector 1 is supplied to the timing generator 2. The timing generator 2 is composed of a counter, for example. When the counter of the timing generator 2 counts the header detection pulse 7, the timing generator 2 generates timing pulses for latching a variety of information provided in the header of the SDDI format, such as a latch number latch pulse 22 and a transmitting source identifying code timing pulse 23.

The timing generator 2 supplies the line number latch pulse 22 to a line number extracting circuit 20,. The 10-bit parallel signal 6 is also supplied to the line number extracting circuit 20. The line number extracting circuit 20 latches the 10-bit parallel signal 6 therein in response to the latch number latch pulse 22 supplied thereto as a clock, whereby the line number extracting circuit 20 latches a line number signal 24 therein. The line number extracting circuit 20 is composed of a latch, for example.

The timing generator 2 supplies the transmitting source identifying code timing pulse 23 to a line-masking circuit 21. The line number extracting circuit 20 supplies the line number signal 24 to the line-masking circuit 21.

Figure 10:
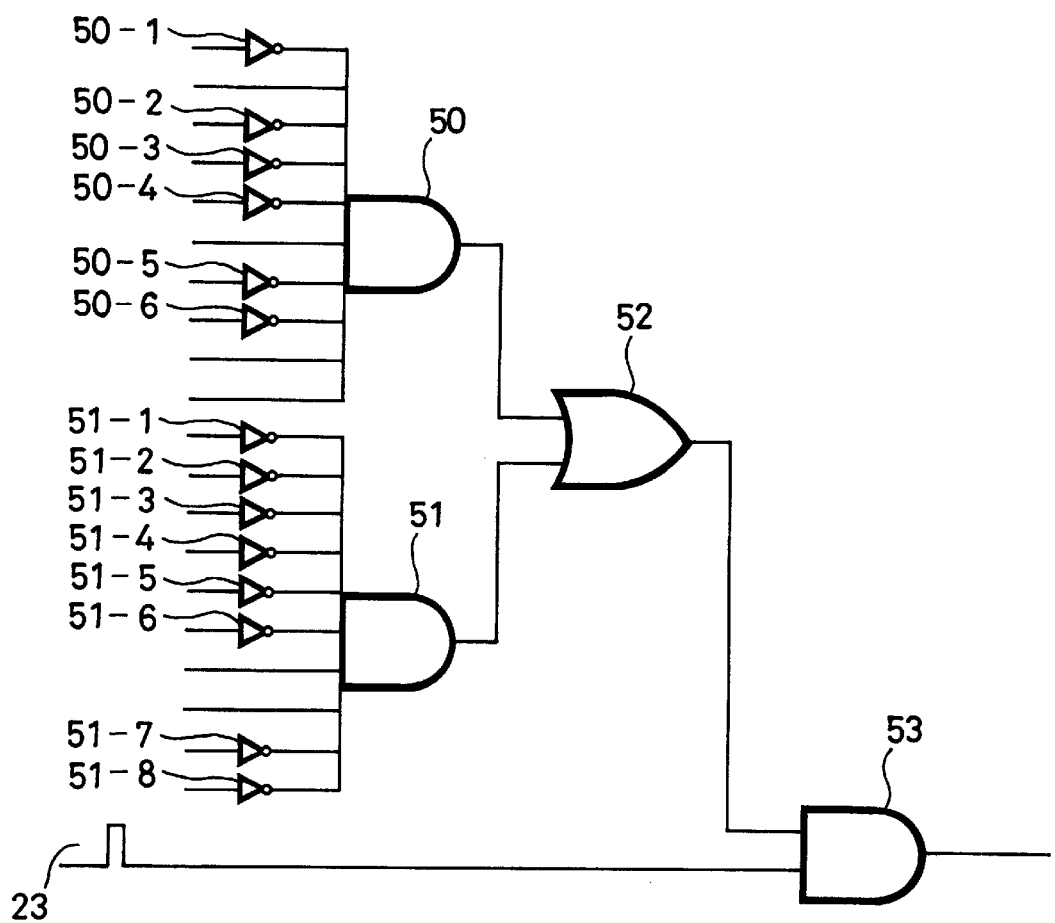
FIG. 10 is a circuit diagram showing a line-masking circuit shown in FIG. 9 more in detail.

FIG. 10 is a circuit diagram showing more in detail the line-masking circuit 21 shown in FIG. 9.

As shown in FIG. 10, when (0100010011)$_2$ of binary signal, i.e., (275)$_{10}$ of decimal signal is supplied to a 10-bit AND circuit 50 of a first stage through inverters 50-1, 50-2, 50-3, 50-4, 50-5, 50-6, the first 10-bit input AND circuit 50 supplies a detection signal to an OR circuit 52.

When (0000001100)$_2$ of binary signal, i.e., (012)$_{10}$ of decimal signal is supplied to a 10-bit input AND circuit 51 of a second stage through inverters 51-1, 51-2, 51-3, 51-4, 51-5, 516, 51-7, 51-8, the 10-bit AND circuit 51 supplies a detection signal to the OR circuit 52. When any one of the detection signals from the 10-bit AND circuits 50 and 51 is supplied to the OR circuit 52, the OR circuit 52 supplies a detection signal to an AND circuit 53. When the detection signal from the OR circuit 52 and the transmitting source identifying code timing pulse 23 are both supplied to the AND circuit 53, the AND circuit 53 outputs a transmitting source identifying code latch pulse 25.

Thus, only when the line number is the next line next to the previously-determined signal switching position, i.e., line number 12 or line number 275, the line-masking circuit 21 passes the transmitting source identifying codes timing pulse 23 therethrough, and outputs the same as the transmitting source identifying code latch pulse 25.

Referring back to FIG. 9, the transmitting source identifying code latch pulse 25 is supplied to the transmitting source identifying code extracting circuit 3 and the preceding transmitting source identifying code holding circuit 4. The other 10-bit parallel signal 6 is supplied to the transmitting source identifying code extracting circuit 3, and the transmitting source code latch pulse 25 is supplied to the transmitting source identifying code extracting circuit 3. The transmitting source identifying code extracting circuit 3 is composed of a latch, for example. The transmitting source identifying code extracting circuit 3 latches data of the 10-bit parallel signal 6 supplied at that time in response to the transmitting source identifying code latch pulse 25 as a clock. As a consequence, the transmitting source identifying code extracting circuit 3 latches therein a 16-word (128-bit) transmitting source identifying code 9.

The transmitting source identifying code 9 thus latched is supplied to a video equipment body (not shown), and used in discriminating or displaying the signal transmitting source equipment. The transmitting source identifying code 9 is supplied to the preceding transmitting source identifying code holding circuit 4 and the transmitting source identifying code comparator 5. The preceding transmitting source identifying code holding circuit 4 is composed of a latch, for example. The preceding transmitting source identifying code holding circuit 4 latches therein the one-field-preceding preceding transmitting source identifying code 10, which was latched in the transmitting source identifying code extracting circuit 3, in response to the transmitting source identifying code latch pulse 25 supplied thereto as a clock.

The transmitting source identifying code comparator 5 compares the preceding transmitting source identifying code 10 held in the preceding transmitting source identifying code holding circuit 4 and the transmitting source identifying code 9 thus newly latched by the transmitting source identifying code extracting circuit 3. Therefore, when the transmitting source identifying code 9 and the preceding transmitting source identifying code 10 are not agreed with each otter, the transmitting source identifying code comparator 5 determines that the signal was switched, and then outputs the signal switching detection signal 11.

FIGS. 11A through 11I are timing charts showing a manner in which a switching of a signal is detected at the field unit in the method of and apparatus for identifying a signal transmitting source according to another embodiment of the present invention.

FIG. 11A shows the 10-bit parallel signal 6, FIG. 11B shows the header detection pulse 7, FIG. 11C shows the line number latch pulse 22, FIG. 11D shows the transmitting source identifying code timing pulse 23, FIG. 11E shows the line number signal 24, FIG. 11F shows the transmitting source identifying code latch pulse 25, FIG. 11G shows the transmitting source identifying code 9, FIG. 11H shows the preceding transmitting source identifying code 10, and FIG. 11I shows the signal switching detection signal 11, respectively. A manner in which the switching of signal is detected will be described below.

As shown in FIG. 11A, the 10-bit parallel signal 6 is switched from a signal #1 to a signal #2 at a signal switching portion 71. A hatched portion of the 10-bit parallel signal 6 represents the header of the SDDI format. The header is transmitted at every line. The 10-bit parallel signal 6 is supplied to the header detector 1, the line number extracting circuit 20, and the transmitting source identifying code extracting circuit 3 as shown in FIG. 9.

As shown in FIG. 11B, the header detector 1 generates the header detection pulse 7 by detecting the header of the SDDI format. The header detection pulse 7 is a pulse having a predetermined pulse width and which rises in synchronism with the leading edge of the header of the SDDI format. The header detection pulse 7 is outputted from the header detector 1 as shown in FIG. 9.

As shown in FIG. 11C, the timing generator 2 generates the line number latch pulse 22 on the basis of the header detection pulse 7 after a predetermined period of time from the header detection pulse 7. As shown in FIG. 9, the timing generator 2 outputs the line number latch pulse 22 by counting the header detection pulse 7.

As shown in FIG. 11D, the timing generator 2 generates the transmitting source identifying code timing pulse 23 on the basis of the header detection pulse 7 after a predetermined time from the header detection pulse 7. As shown in FIG. 9, the timing generator 2 outputs the transmitting source identifying code timing pulse 23 by counting the header detection pulse 7.

As shown in FIG. 11E, the line number extracting circuit 20 generates the line number signal 24 whose one line ranges from the trailing edge of the line number latch pulse 22 to the trailing edge of the next line number latch pulse 22. As shown in FIG. 9, the line number extracting circuit 20 outputs the line number signal 24 by latching the 10-bit parallel signal 6 in response to the line number latch pulse 22 supplied thereto as a clock.

As shown in FIG. 11F, only when the line number is the next line of the next of the predetermined signal switching positions 71, 72, i.e., line number 275 or line number 12, the line-masking circuit 21 opens its gate to pass the transmitting source identifying code timing pulse 23 to pass therethrough to provide the transmitting source identifying code latch pulse 25. As shown in FIG. 9, the line-masking circuit 21 outputs the transmitting source identifying code latch pulse 25 by passing the transmitting source identifying code timing pulse 23 therethrough only when the line number signal is the line number 12 or 275.

As shown in FIG. 11G, the transmitting identifying code signal 9 of address #2 is obtained at the trailing edge of the transmitting identifying code latch pulse 25 that was first detected after the signal of the signal switching portion 71 has been switched. The addresses #1 and #2 are addresses corresponding to the transmitting sources of the signals #1 and #2.

As shown in FIG. 11H, there is obtained the one-field-preceding transmitting source identifying code 10 of the transmitting source identifying code 9. As shown in FIG. 9, the preceding transmitting source identifying code holding circuit 4 outputs the preceding transmitting source identifying code 10 by latching the transmitting source identifying code 9 in response to the transmitting source identifying code latch pulse 22 supplied thereto as a clock.

As shown in FIG. 11I, the signal switching detection signal 11 is obtained at the timing of the trailing edge of the transmitting source identifying code latch pulse 25 that was first detected after the signal has been switched. The signal switching detection signal 11 has a predetermined time width corresponding to the difference of period between the period of the transmitting source identifying code 9 and the preceding transmitting source identifying code 10. As shown in FIG. 9, the transmitting source identifying code comparator 5 outputs the signal switching detection signal 11 by comparing the transmitting source identifying code 9 and the preceding transmitting source identifying code 10.

According to the above embodiment, the transmitting source identifying code is extracted from the SDDI format header of the received signal, the transmitting source identifying code indicative of the transmitting source added to the transmission signal upon transmission is extracted, the charge of the transmitting source identifying code indicative of the transmitting source added to the transmission signal upon transmission is detected, and the switching of the transmission signal is detected based on the transmitting source identifying code thus changed, thereby making it possible to detect the switching of the transmitting source at the field unit.

According to the above embodiment, since the transmitting source identifying code 9 is provided in the header area 83 of the SDDI format of the transmission signal, it is possible to detect the switching of the transmitting source identifying code 9 only by detecting the header area 83 of the SDDI format of the transmission signal.

According to the above embodiment, since the transmitting source identifying code extracting circuit 3, the preceding transmitting source identifying code holding circuit 4 and the transmitting source identifying code comparing circuit 5 are provided at the front stage of the image information decoder 113, the audio information decoder 114 and the control information decoder 115 for decoding the received signal, the image information decoder 113, the audio information decoder 114 and the control information decoder 115 can effect various control operations on image information, audio information and control information based on the signal switching detection signal in the transmitting source identifying code extracting circuit 3, the preceding transmitting source identifying code holding circuit 4 and the transmitting source identifying code comparator 5.

According to the above embodiment, the transmitting source identifying code change detecting means is the preceding transmitting source identifying code holding circuit 4 for holding the preceding transmitting source identifying code 10 which is one-frame-preceding or one-field-preceding the transmitting source identifying code 9 extracted by the transmitting source identifying code extracting circuit 3, and the transmission signal switching detecting means is the transmitting source identifying code comparator 5 for comparing the transmitting source identifying code 9 extracted by the transmitting source identifying code extracting circuit 3 and the preceding transmitting source identifying code 10 held in the preceding transmitting source identifying code holding circuit 4. With the above arrangement, the preceding transmitting source identifying code 10 is held and the transmitting source identifying code 9 and the preceding transmitting source identifying code 10 are compared with each other, thereby making it possible to detect the switching of the transmission signal.

According to the method of identifying a transmitting source wherein the transmitting source identifying code 9 is added to the transmission signal at the transmission end of the transmission line, the transmitting source identifying code 9 is extracted from the receiving end of the transmission line, the change of the transmitting source identifying code 9 extracted at the receiving end is changed and the switching of the transmission signal is detected on the basis of the changed transmitting source identifying code 9, it is possible to detect the switching of the transmission signal.

When image information is compressed and encoded, it is frequently observed that image information is compressed by use of interfield or interframe correlation. At that time, the image information is encoded over a plurality of fields. As a result, if this image information is switched in somewhere of the image information, then a reproduced picture is destroyed at the succeeding field. Therefore, when image information is compressed and encoded, in order to initialize an image reproducing circuit, the compression and encoding of image information may be completed at a constant period, e.g., 2 frames, for example. With the above arrangement, even when the circuit is activated or compressed and encoded data is destroyed due to some cause, a normal reproduced image can be obtained after the period in which the encoding is completed.

The image information decoder 113 discards reproduced images obtained after the field where the switching of signal was detected and continues outputting reproduced images obtained immediately before the switching when a switching of signal is detected during compressed and decoded image information is received (when the image information decoder 113 is supplied with the signal switching detection signal 11 or 118). With this arrangement, a destroyed reproduced image can be prevented from being outputted, and a so-called freeze picture can be outputted. Then, if a normal reproduced image is outputted from the next code completion period, then it is possible to prevent a reproduced image from being destroyed when the signal is switched.

When audio information is compressed and encoded, it is frequently observed that audio information is compressed by use of correlation of preceding and succeeding samples. At that time, audio information is encoded over a plurality of fields. If such audio information is switched in somewhere of the audio information, then a reproduced sound is destroyed at the succeeding samples. When audio information is compressed and encoded, in order to initialize an audio reproducing circuit, a compressed code may be completed at a constant period, e.g., 2 frames. With such arrangement, even if compressed and encoded audio data is destroyed when the circuit is activated or due to some cause, a normal reproduced sound can be obtained after the period wherein the compressed code has been completed.

When the audio information decoder 114 detects the switching of signal during compressed and encoded audio information is received (when the signal switching detection signal 11 or 118 is supplied to the audio information decoder 114), a reproduced sound obtained after the same wherein the switching was detected is muted. With the above arrangement, destroyed reproduced sound can be prevented from being outputted. If normal reproduced sound is outputted after the period wherein the compressed code has been completed, then it is possible to prevent reproduced sound from being destroyed due to the switching of signal.

Further, if data of control signal is switched in somewhere of data, then a received control signal becomes erroneous. If such erroneous control signal is used as it is, then the system will malfunction. Accordingly, when the control information receiver 115 detects the switching of signal during control information is received (when the signal switching detection signal 11 or 118 is supplied to the control information receiver 115), the control information receiver 115 discards received control information, and holds the previous state. With the above arrangement, it is possible to prevent the system from malfunctioning.

While the system of the SDDI format in the synchronization of 525/60 system has been described so far, the principle of the present invention can be similarly applied to the system of SDDI format of other synchronization such as the 625/50 system.

Further, while the data transmission using the coaxial cable has been described so far, the principle of the present invention can be similarly applied to other transmission systems, such as optical fiber transmission system or radio communication system.

As described above, the transmitting source identifying code has already been standardized as the format in the header of the SDDI format. The transmission and reception system according to the SDDI format that has been previously-proposed by the same assignee of the present application is provided with both a transmitting source identifying code adding circuit on the transmission side (not shown) and the transmitting source identifying code extracting circuit 3 on the reception side. Therefore, without adding new information on the transmission side and without adding a new circuit on the transmission side, a switching of signal can be detected with a high reliability by addition of a simplified comparing circuit on the reception side.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A receiving apparatus for receiving a transmitted signal with a transmitting source identifying code added thereto at a transmission end of a transmission line as a received signal, comprising:

transmitting source identifying code extracting means for extracting said transmitting source identifying code indicative of an address of a transmitting source from said received signal prior to output of said received signal at said transmission end of said receiving line;

transmitting source identifying code change detecting means for detecting a change of said transmitting source identifying code extracted from said received signal by said transmitting source identifying code extracting means by comparing said extracted transmitting source identifying code with a previously extracted transmitting source identifying code; and transmitted signal switching detecting means for detecting a switching of said transmitted signal based on said transmitting source identifying code whose change was detected by said transmitting source identifying code detecting means.

2. The receiving apparatus according to claim 1, wherein said transmitting source identifying code is provided in a header area of said transmitted signal.

3. The receiving apparatus according to claim 2, further comprising line number extracting means for extracting line numbers provided in said header area, said transmitting source identifying code extracting means extracting only a transmitting source identifying code provided in a header area having a predetermined line number.

4. The receiving apparatus according to claim 1, wherein said transmitting source identifying code extracting means, said transmitting source identifying code change detecting means, and said transmitted signal switching detecting means are disposed at the front stage of decoding means for decoding said received signal.

5. The receiving apparatus according to claim 1, wherein said transmitting source identifying code change detecting means includes a preceding transmitting source identifying code holding circuit for holding a preceding transmitting source identifying code of one-frame- or one-field-preceding said transmitting source identifying code extracted by said transmitting source identifying code extracting means, and said transmitted signal switching detecting means includes a transmitting source identifying code comparing circuit for comparing said transmitting source identifying code extracted by said transmitting source identifying code extracting means and said preceding transmitting source identifying code held by said preceding transmitting source identifying code holding circuit.

6. A method of switching a transmitted signal comprising the steps of:

adding a transmitting source identifying code indicative of an address of a transmitting source to a transmitted signal at a transmitting end of a transmission line;

extracting said transmitting source identifying code at a receiving end of said transmission line prior to output of said transmitted signal at said receiving end of said transmission line;

detecting a change of said transmitting source identifying code extracted at said receiving end by comparing said extracted transmitting source identifying code with a previously extracted transmitting source identifying code; and detecting a switching of said transmitted signal based on said transmitting source identifying code having changed.

* * * * *